(12) United States Patent
Kitahara et al.

(10) Patent No.: US 8,593,723 B2
(45) Date of Patent: Nov. 26, 2013

(54) METHOD OF MANUFACTURING VARIABLE WAVELENGTH INTERFERENCE FILTER AND VARIABLE WAVELENGTH INTERFERENCE FILTER

(75) Inventors: Koji Kitahara, Ina (JP); Akira Sano, Shiojiri (JP)

(73) Assignee: Seiko Epson Corporation (JP)

( * ) Notice: Subject to any disclaimer, the term of this patent is extended or adjusted under 35 U.S.C. 154(b) by 406 days.

(21) Appl. No.: 13/084,770

(22) Filed: Apr. 12, 2011

(65) Prior Publication Data

US 2011/0252636 A1 Oct. 20, 2011

(30) Foreign Application Priority Data

Apr. 16, 2010 (JP) ................. 2010-094765

(51) Int. Cl.
*H01S 3/00* (2006.01)
*H01S 4/00* (2006.01)

(52) U.S. Cl.
USPC .... 359/337.2; 29/592.1; 29/825; 359/337.21; 359/337.22

(58) Field of Classification Search
USPC ................. 29/592.1, 825; 359/337.2, 337.21, 359/337.22
See application file for complete search history.

(56) References Cited

FOREIGN PATENT DOCUMENTS

| JP | 2000193526 (A) | * 7/2000 |
|----|----------------|----------|
| JP | 2001-281443 | 10/2001 |
| JP | 2003-195031 | 7/2003 |
| JP | 2006-350124 | 12/2006 |
| JP | 2007-106085 | 4/2007 |
| JP | 2009-134027 | 6/2009 |

* cited by examiner

*Primary Examiner* — Carl Arbes
(74) *Attorney, Agent, or Firm* — Harness, Dickey & Pierce, P.L.C.

(57) ABSTRACT

A method of manufacturing a variable wavelength interference filter includes forming an electrostatic gap forming groove, a wiring forming groove extending from the electrostatic gap forming groove to an outer peripheral edge of the chip region, and an air communication groove through which the wiring groove forming groove communicates with the outside of the first substrate, in a chip region of a first substrate.

5 Claims, 5 Drawing Sheets

METHOD OF MANUFACTURING VARIABLE WAVELENGTH INTERFERENCE FILTER AND VARIABLE WAVELENGTH INTERFERENCE FILTER

BACKGROUND

1. Technical Field

The present invention relates to a method of manufacturing a variable wavelength interference filter that selects and emits a light a desired objective wavelength from incident light.

2. Related Art

A variable wavelength interference filter is known in which high reflection mirrors are oppositely disposed on the opposing surfaces of a pair of substrates, respectively. In such a variable wavelength interference filter, by reflecting the light between a pair of mirrors, causing only the light of a specific wavelength to be transmitted therethrough, and removing the light of other wavelengths by the interference, only the light of a specific wavelength is caused to be transmitted from the incident light. At this time, in order to cause only the light of a desired wavelength to be transmitted by changing the distance (gap) between the mirrors, high gap accuracy is required in the variable wavelength interference filter. In order to improve the gap accuracy, it is important to secure a uniform joining strength in the opposing substrates surfaces.

Thus, various joining methods are suggested such as a method of applying an adhesive to all joining surface regions, a joining method of interposing a spacer, and a joining method of using a siloxane combination (for example, see JP-A-2001-281443, JP-A-2003-195031, JP-A-2006-350124, and JP-A-2009-134027).

However, in the case of using the joining methods described in the above patent documents, since air is gathered in a gap between the opposing substrates upon gluing the opposing substrates and an internal pressure increases, there is a problem in that the gap between the mirrors cannot be accurately controlled. Furthermore, since a space, where the gap is formed, is sealed, the internal pressure increases due to a change in atmospheric pressure in some cases, and also in this case, the gap cannot be accurately controlled.

SUMMARY

An advantage of some aspects of the invention is to provide a method of manufacturing a variable wavelength interference filter that suppresses an increase in internal pressure of a space where a gap is formed, and thus improve the accuracy of the gap.

According to an aspect of the present invention, there is provided a method of manufacturing a variable wavelength interference filter including a first substrate groove forming process in which, in a chip region of a first substrate having a translucency, an electrostatic gap forming groove for forming an electrostatic gap and a wiring forming groove extending from the electrostatic gap forming groove to an outer peripheral edge of the chip region are formed, and in a region other than the chip region of the first substrate, an air communication groove through which the wiring groove forming groove communicates with the outer peripheral edge of the first substrate is formed; a first substrate wiring forming process in which a first reflection film and a first electrode are formed in the electrostatic gap forming groove, and a first wiring to be connected to the first electrode along the wiring forming groove is formed; a second substrate forming process of forming a second substrate having translucency which includes a second reflection film facing the first reflection film, a second electrode facing the first electrode, and a second wiring that faces the wiring forming groove and is connected to the second electrode; and a gluing process of gluing the first substrate and the second substrate.

According to the aspect of the invention, after the electrostatic gap forming groove, the wiring forming groove, and the air communication groove are formed in the first substrate and the electrode and the wiring are formed in the grooves, the first substrate and the second substrate are glued to each other. Since the electrostatic gap forming groove, the wiring forming groove, and the air communication groove communicate with each other and communicate with the outside of the first substrate, upon gluing the first substrate and the second substrate, it is possible to discharge the air in a space (hereinafter, also referred to as a gap forming space) where the gap is formed to the outside of the first substrate. Thus, since an occurrence of air stagnation in the gap forming space can be prevented, it is possible to manufacture a variable wavelength interference filter capable of accurately performing the control of the gap. Such a variable wavelength interference filter exhibits an excellent optical property.

Furthermore, at the time of the manufacturing, since an increase in internal pressure can be prevented by discharging the air in the gap forming space, it is possible to prevent distortion that is generated in the first substrate and the second substrate due to the internal pressure.

In addition, upon using the wavelength variable filter thus manufactured, since the internal pressure is not applied to the gap forming space, the variability of the gap can be easily controlled, and the wavelength variable filter can be driven at a low electric power.

In the method of manufacturing the variable wavelength interference filter according to the aspect of the invention, it is desirable that a plurality of chip regions which are disposed adjacently to each other in the first substrate, and, in the first substrate groove forming process, the wiring forming grooves, which are connected to each other in the outer peripheral edges of the chip regions adjacent to each other, are formed.

In the aspect of the invention, the electrostatic gap forming groove, and the wiring forming groove are formed in the plurality of chip regions, respectively. The wiring forming grooves extend to the outer periphery edges of the respective chip regions, and the respective wiring forming grooves are formed so as to be connected to the wiring forming grooves of the adjacent chip regions. That is, the electrostatic gap forming grooves and the wiring forming grooves of all the adjacent chip regions communicate with each other.

For this reason, it is possible to effectively and uniformly discharge the air in the gap forming spaces formed in the respective chip regions to the outside of the first substrate, and even in a case where the plurality of chip regions is arranged in a two-dimensional array shape, it is possible to manufacture a variable wavelength interference filter having no irregularity in quality.

In the variable wavelength interference filter according to the aspect of the invention, it is desirable that a chip array with the plurality of chip regions disposed therein is formed on the first substrate, and a part of the air communication groove is provided along the outer periphery of the chip array.

In the aspect of the invention, the chip array, in which the plurality of chip regions which are disposed adjacently to each other, is formed, and the air communication groove is provided along the outer periphery of the chip array. Since the air communication groove is connected to the wiring forming groove extending to the outer periphery edges of the respective chip regions, it is possible to effectively discharge the air in the gap forming spaces formed in the respective chip region to the outside of the first substrate.

Particularly, in a case where the plurality of chip regions is formed on the first substrate, when forming the air communication groove extending from the wiring forming grooves of all the chip regions to the outer periphery edge of the first substrate, the number of the air communication grooves extending to the outer periphery edge of the first substrate is increased, and the strength of the first substrate declines, which becomes a cause of splitting. However, in the aspect of the invention, the air communication grooves provided along the outer peripheries of the plurality of chip regions are connected to the wiring forming grooves of the respective chip regions. Moreover, by connecting the air communication groove extending to the outer periphery edge of the first substrate to the air communication groove provided along the outer peripheries of the plurality of chip regions, the air in the gap forming space of all the chip regions can be discharged to the outside of the first substrate. That is, since the air communication grooves extending to the outer periphery edge of the first substrate can be formed in a small number, it is possible to prevent the substrate division in the manufacturing process and reduce the occurrence of faults.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a configuration and a manufacturing method of an etalon which constitutes a variable wavelength interference filter of an embodiment according to the invention will be described with reference to the drawings.

1. Configuration of Etalon

Figure 1:
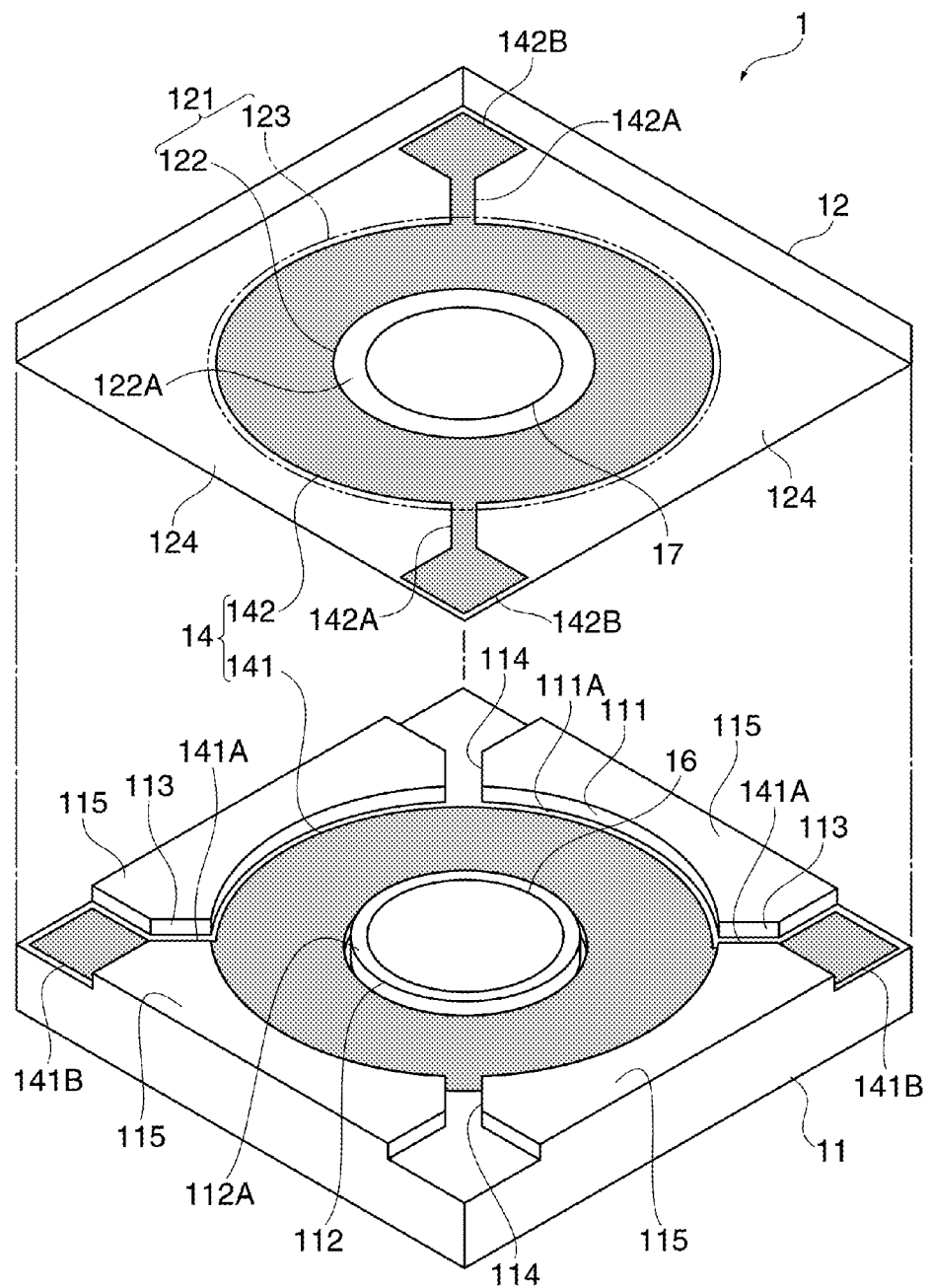
FIG. 1 is a perspective view that shows a schematic configuration of a base substrate of an etalon and a diaphragm substrate that constitute a variable wavelength interference filter of an embodiment according to the present invention.

As shown in FIG. 1, an etalon 1 is a plate-shaped optical member having a square plane, and a side thereof is formed, for example, at 10 mm. The etalon 1 includes a base substrate 11 and a diaphragm substrate 12. The two substrates 11 and 12 are formed of various glasses such as soda glass, crystalline glass, quartz glass, lead glass, potassium glass, borosilicate glass, and alkali free glass, crystal, and the like. Moreover, the two substrates 11 and 12 are integrally constituted by the joining of joining surfaces 115 and 124 formed in a substrate outer peripheral portion.

Furthermore, between the base substrate 11 and the diaphragm substrate 12, a fixed mirror 16 and a movable mirror 17 constituting a pair of mirrors of an embodiment of the invention are provided. Herein, the fixed mirror 16 is fixed on a surface of the base substrate 11 facing the diaphragm substrate 12, and the movable mirror 17 is fixed on a surface of the diaphragm substrate 12 facing the base substrate 11. Furthermore, the fixed mirror 16 and the movable mirror 17 are disposed oppositely via an inter-mirror gap.

In addition, between the base substrate 11 and the diaphragm substrate 12, an electrostatic actuator 14 for adjusting the size of the inter-mirror gap between the fixed mirror 16 and the movable mirror 17 is provided.

1-1. Configuration of Base Substrate

The base substrate 11 is formed by machining a glass base material having a thickness of, for example, 500 μm by an etching. Specifically, as shown in FIG. 1, in the base substrate 11, an electrostatic gap forming groove 111 and a mirror fixing portion 112 are formed by etching.

The electrostatic gap forming groove 111 is formed in a circular shape around a plane center point in a plan view (hereinafter, referred to as an etalon plan view) when the etalon 1 is seen from a thickness direction. The mirror fixing portion 112 is formed to protrude from the center portion of the electrostatic gap forming groove 111 to the diaphragm substrate 12 side in the plan view.

In the electrostatic gap forming groove 111, a ring-shaped electrode fixing surface 111A is formed between the outer peripheral edge of the mirror fixing portion 112 to the inner peripheral wall surface of the electrostatic gap forming groove 111, and a first electrode 141 is formed in the electrode fixing surface 111A. In the first electrode 141, if a material has conductivity and can generate an electrostatic attraction force between the first electrode 141 and a second electrode 142 by applying the voltage between the first electrode 141 and the second electrode of a diaphragm substrate 12 described later, the material is not particularly limited, but, in the present embodiment, Au/Cr alloy (gold-chromium alloy) is used which can also be used as a joining film.

Furthermore, on the base substrate 11, from the electrode fixing surface 111A to peaks (left and right peaks in FIG. 1) symmetrical to each other with respect to the plane center point, a first wiring forming groove 113 having a bottom surface 113A becoming the same plane as the electrode fixing surface 111A is formed.

Moreover, on the bottom surface of the first wiring forming groove 113, a first wiring portion 141A extending from a part of the outer peripheral edge of the first electrode 141 is formed, and in an end (a peak) of the first wiring portion 141A, a first electrode pad 141B for applying a predetermined voltage to the first electrode 141 is formed. The first electrode 141, the first wiring portion 141A and the first electrode pad 141B are electrodes that are integrally formed of Au/Cr alloy.

Meanwhile, from the electrode fixing surface 111A of the base substrate 11 to the peak (up and down peak in FIG. 1) on which the first electrode pad 141B is not formed, a second wiring forming groove 114 having a bottom surface becoming the same plane as the electrode fixing surface 111A is formed.

Herein, in the base substrate 11, a portion without the groove formed thereon becomes a joining surface 115 of the base substrate 11. A joining film for joining (not shown) is formed on the joining surface 115 in a film shape and is joined to the diaphragm substrate 12.

Furthermore, when the base substrate 11 is joined to the diaphragm substrate 12 via a metal, it is desirable to use Au/Cr alloy as the joining film for joining. By forming the respective electrode or the joining film on the base substrate 11 of the same material, it is possible to easily form the electrode or the joining film. That is, the electrode and the joining film are formed by a method such as a sputtering after the electrostatic gap forming groove 111 (the electrode fixing surface 111A), the mirror fixing portion 112, the first wiring forming groove 113, and the second forming groove 114 are formed by etching in the manufacturing of the base substrate 11. At this time, there is no need to divide the manufacturing process for forming the respective electrodes or the joining film, and it is possible to form the first electrode 141, the first wiring portion 141A, the first electrode pad 141B and the joining film in one process.

As mentioned above, the mirror fixing portion 112 is formed in a cylindrical shape which becomes a smaller diameter size than the electrostatic gap forming groove 111 on the same axis as the electrostatic gap forming groove 111. In addition, in the present embodiment, an example is described in which the mirror fixing surface 112A of the mirror fixing portion 112 facing the diaphragm substrate 12 is formed near the diaphragm substrate 12 further than the electrode fixing surface 111A, but the embodiment is not limited thereto. Height positions of the electrode fixing surface 111A and the mirror fixing surface 112A are suitably set by a size of an inter-mirror gap between the fixing mirror 16 to be fixed to the mirror fixing surface 112A and the movable mirror 17 to be formed on the diaphragm substrate 12, a size between the first electrode 141 and a second electrode 142 to be formed on the diaphragm substrate 12 described later, and the thickness sizes of the fixing mirror 16 or the movable mirror, and are not limited to the above configurations. For example, when a dielectric multilayer film mirror is used for the mirrors 16 and 17 and the thickness size thereof increases, a configuration in which the electrode fixing surface 111A and the mirror fixing surface 112A are formed on the same surface, or a configuration, in which a mirror fixing groove on a cylindrical concave groove is formed in the center portion of the electrode fixing surface 111A and the mirror fixing surface 112A is formed on a bottom surface of the mirror fixing groove, may be adopted.

Furthermore, on the mirror fixing surface 112A of the mirror fixing portion 112, it is desirable that a groove depth is designed in view of a wavelength region that is permitted to be transmitted therethrough by the etalon 1. For example, in the present embodiment, an initial value (a size of the inter-mirror gap of a state in which the voltage is not applied between the first electrode 141 and the second electrode 142) of the inter-mirror gap between the fixed mirror 16 and the movable mirror 17 is set to 450 nm, and, by applying the voltage between the first electrode 141 and the second electrode 142, the movable mirror 17 can be displaced until the inter-mirror gap becomes, for example, 250 nm. As a result, by changing the voltage between the first electrode 141 and the second electrode 142, the light of the wavelengths of all visible light regions can be selectively divided and can be transmitted. In this case, the film thicknesses of the fixed mirror 16 and the movable mirror 17 and height sizes of the mirror fixing surface 112A or the electrode fixing surface 111A may be set to values that can displace the inter-mirror gap to between 250 nm and 450 nm.

Moreover, a circular fixed mirror 16 having a diameter of about 3 mm is fixed on the mirror fixing surface 112A. The fixed mirror 16 is a mirror formed of an AgC single layer and is formed on the mirror fixing surface 112A by a method such as a sputtering.

In addition, in the present embodiment, an example is shown in which the mirror of an AgC single layer is used as the fixed mirror 16 that can cover all the visible light regions as the wavelength region that can be divided by the etalon 1, but the invention is not limited thereto, that is, a configuration may be adopted which uses, for example, a $TiO_2$—$SiO_2$ based dielectric multilayer film mirror in which the wavelength dividable by the etalon 1 is narrow, but the transmissivity of the divided light is higher and the half value width of the transmissivity is narrower than the AgC single-layer mirror, and the resolution is satisfactory. However, in this case, as mentioned-above, there is a need to suitably set the height positions of the mirror fixing surface 112A or the electrode fixing surface 111A of the base substrate 11 by the fixed mirror 16 or the movable mirror 17, the wavelength selection region of the divided light or the like.

In addition, in the base substrate 11, on a lower surface of a side opposite to the upper surface facing the diaphragm substrate 12, in a position corresponding to the fixed mirror 16, a reflection prevention film (AR) (not shown) is formed. The reflection prevention film is formed by alternately stacking a low refractive index film and a high refractive index film, and lowers the reflectivity of the visible light on the surface of the base substrate 11, thereby enhancing the transmissivity.

1-2. Configuration of Diaphragm Substrate

The diaphragm substrate 12 is formed by machining a glass base material having a thickness of, for example, 200 μm by etching. Specifically, in the diaphragm substrate 12, a circular displacement portion 121 around the substrate center point is formed. The displacement portion 121 includes a cylindrical movable portion 122, and a connection maintenance portion 123 that is the same axis as the movable portion 122 and maintains the movable portion 122.

The movable portion 122 is formed to have a thickness size greater than the connection maintenance portion 123, and in the present embodiment, the thickness size is formed at 200 μm that is the same size as the thickness size of the diaphragm substrate 12. Furthermore, the movable portion 122 includes a movable surface 122A parallel to the mirror fixing portion 112, and the movable mirror 17 is fixed on the movable surface 122A. Herein, a pair of mirrors of the embodiment of the invention is constituted by the movable mirror 17 and the fixed mirror 16.

Herein, as the movable mirror 17, a mirror having the same configuration as the fixed mirror 16 is used, and in the present embodiment, the AgC single layer mirror is used. Furthermore, the film thickness size of the AgC single layer mirror is formed, for example, at 0.03 μm.

In the movable portion 122, on the upper surface of a side opposite to the movable surface 122A, in a position corresponding to the movable mirror 17, a reflection prevention film (AR) (not shown) is formed. The reflection prevention film has the same configuration as the reflection prevention film formed on the base substrate 11 and is formed by alternately stacking a low refractive index film and a high refractive index film.

The connection maintenance portion 123 is a diaphragm surrounding the periphery of the movable portion 122, and has a thickness size of, for example, 50 μm. On a surface of the connection maintenance portion 123 facing the base substrate 11, a ring-shaped second electrode 142 facing the first electrode 141 via an electromagnetic gap of about 1 μm is formed. Herein, the electrostatic actuator 14 which is a variable unit of the embodiment of the invention is constituted by the second electrode 142 and the first electrode 141. The second electrode 142 is formed of Au/Cr alloy, similarly to the respective electrodes formed on the base substrate 11. Furthermore, in the case of joining the base substrate 11 and the diaphragm substrate 12 via a metal, it is desirable to use Au/Cr alloy as the joining film similarly to the joining film of the base substrate 11.

Furthermore, in the diaphragm substrate 12, on the surface facing the base substrate 11, regions other than the displacement portion 121 become the joining surface 124 in the diaphragm substrate 12. The joining surface 124 faces the joining surface 115 of the base substrate 11, and on the joining surface 124, a joining film (not shown) is provided which forms the Au/Cr alloy in a film shape.

Moreover, from a part of the outer peripheral edge of the second electrode 142, a pair of second wiring portions 142A is directed in an outer peripheral direction, and is, specifically, extended and formed in the up and down peak direction in FIG. 1. In the end of the second wiring portion 142A (the peak of the diaphragm substrate 12), a second electrode pad 142B for applying a predetermined voltage to the second electrode 142 is formed. The second electrode 142, the second wiring portion 142A, and the second electrode pad 142B are electrodes formed integrally of Au/Cr alloy and are formed on the diaphragm substrate 12 in the shape of a film by a method such as a sputtering.

In this manner, by forming the respective electrodes or the joining film on the diaphragm substrate 12 of the same material, similarly to the base substrate 11, it is possible to easily perform the forming of such an electrode or joining film. That is, such an electrode and joining film are formed by a method such as a sputtering at the time of the manufacturing of the diaphragm substrate 12. At this time, there is no need to divide the manufacturing process for forming the respective electrodes or joining films, and it is possible to form the second electrode 142, the second wiring portion 142A, the second electrode pad 142B and the joining film in one process.

1-3. Joining Configuration of Base Substrate and Diaphragm Substrate

The etalon 1 is integrally formed by joining the base substrate 11 and the diaphragm substrate 12. At this time, the base substrate 11 and the diaphragm substrate 12 are disposed and joined so that the first electrode 141 of the base substrate 11 overlaps with the second electrode 142 of the diaphragm substrate 12 and the second wiring portion 142A of the diaphragm substrate 12 overlaps with the second wiring forming groove 114 of the base substrate 11. As a result, the joining surface 115 of the base substrate 11 comes into close contact with and is joined to the joining surface 124 of the diaphragm substrate 12.

Herein, in the space that is formed by the electrostatic gap forming groove 111 of the base substrate 11 and the diaphragm substrate 12, a pair of mirrors 16 and 17 and a pair of electrodes 141 and 142 exist, and the space is the gap forming space.

Moreover, by connecting wirings to be connected to a voltage control unit 222 described later to the first electrode pad 141B and the second electrode pad 142B, respectively, the electrostatic actuator 14 can be controlled.

In addition, in the present embodiment, two first electrode pads 141B and two second electrode pads 142B are provided, but, at the time of the driving of the electrostatic actuator 14, the voltage is applied to only any one of two first electrode pads 141B and only any one of two second electrode pads 142B. Moreover, the other first electrode pad 141B and the second electrode pad 142B are used as a detection terminal for detecting electric charge maintenance amounts of the first electrode 141 and the second electrode 142.

2. Manufacturing Method of Etalon

Figure 2:
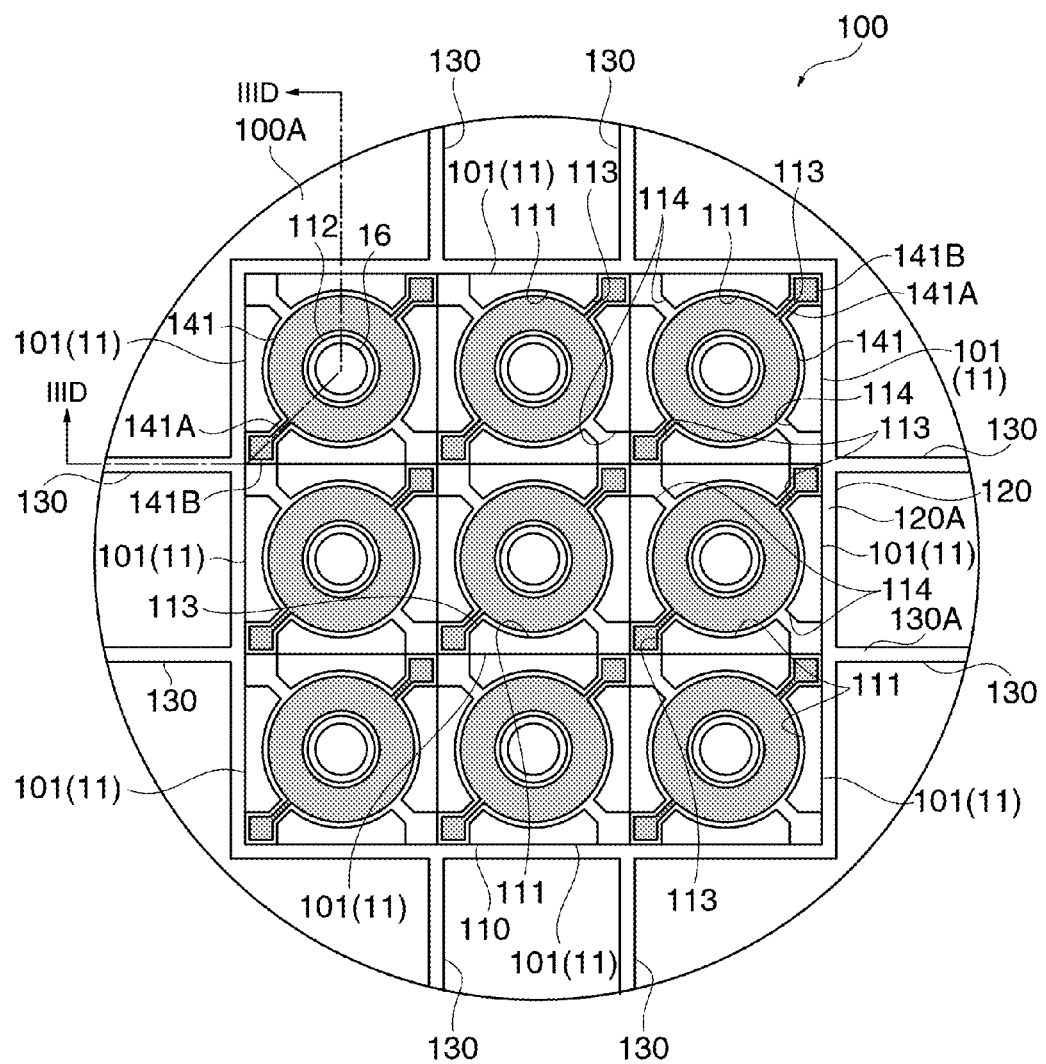
FIG. 2 is a plan view that shows a schematic configuration of a first substrate of the embodiment.

The manufacturing of the etalon 1 is performed, as shown in FIG. 2, by adjoining and forming nine base substrates 11 to the first substrate 100 which is circular glass substrate when seen from the plane, similarly, adjoining and forming nine diaphragm substrates 12 to a second substrate (not shown) which is a circular glass substrate when seen from the plane, overlapping two substrates, and then cutting for each chip. That is, the manufacturing of the etalon 1 is performed by a first substrate groove forming process, a first substrate wiring forming process, a second substrate forming process, a gluing process, and a cutting process.

2-1. Configuration of First Substrate

As shown in FIG. 2, in the first substrate 100, nine base substrates 11 are adjacently formed. A region where one base substrate 11 is formed is a chip region 101, and a region formed of nine chip regions 101 is a chip array 110.

In the respective chip regions 101, the electrostatic gap forming groove 111, the first wiring forming groove 113, and the second wiring forming groove 114 are formed. Since the plurality of chip regions 101 are adjacent to each other, the first wiring forming groove 113 extending to the outer periphery of the chip region 101 is connected to the second wiring forming groove 114 extending to the outer peripheral edge of the adjacent chip region 101. Thus, among the plurality of chip regions 101, all of the electrostatic gap forming grooves 111, the first wiring forming grooves 113, and the second wiring forming grooves 114 communicate with each other.

In the electrostatic gap forming grooves 111, the first wiring forming grooves 113, and the second wiring forming grooves 114 of the respective chip regions 101, the first electrode 141, the first wiring portion 141A and the first electrode pad 141B are formed, respectively.

Furthermore, in the first substrate 100, a first air communication groove 120 is formed along the outer peripheral edge of the chip array 110. The first air communication groove 120 has a bottom surface 120A having the same height as the bottom surfaces of the first wiring forming groove 113 and the second wiring forming groove 114 formed in the chip region 101 and is connected to the end portion of the first wiring forming groove 113 and the second wiring forming groove 114.

Furthermore, a plurality of second air communication grooves 130 extending toward the outer periphery of the first substrate 100 is connected to the first air communication groove 120. The number of the second air communication grooves 130 is not particularly limited, but may be suitably adjusted depending on the joining state of the portion of the outside of the chip array 110. For example, when the joining strength of the portion of the outside of the chip array 110 is required, it is desirable that the number of the second air communication grooves 130 is small, but it is desirable that, in order to easily discharge the air to the outside, the number of the second air communication grooves 130 is large.

The second air communication groove 130 has a bottom surface 130A having the same height as the bottom surface 120A of the first air communication groove 120 and communicates with the first air communication groove 120. That is, all of the electrostatic gap forming groove 111, the first wiring forming groove 113, and the second wiring forming groove 114 formed in the plurality of chip regions 101 communicate with the first air communication groove 120 and the second air communication groove 130.

In the second substrate (not shown), nine diaphragm substrates 12 are adjacently formed. A region, where one diaphragm substrate 12 is formed, is the chip region, similarly to the first substrate, and is formed by nine chip regions. In the respective chip regions, the second electrode 142, the second wiring portion 142A and the second electrode pad 142B are formed.

The first substrate 100 and the second substrate glue nine chip regions in an overlapped manner, respectively. At this time, it is possible to discharge the air in the gap forming space formed for each chip region to the outside of the first substrate 100 and the second substrate by the electrostatic gap forming groove 111, the first wiring forming groove 113, the second wiring forming groove 114, the first air communication groove 120, and the second air communication groove 130. In addition, one chip region when the first substrate 100 and the second substrate are glued to each other becomes one etalon 1.

Figure 3A:
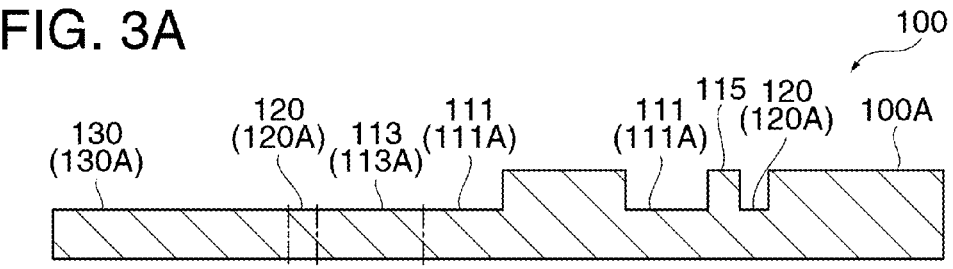
FIGS. 3A to 3D are cross-sectional views that show a manufacturing process of the first substrate of the embodiment.

Hereinafter, the manufacturing process of the etalon 1 will be described based on the drawings. FIGS. 3A to 3D show cross-sectional views of the respective manufacturing processes of the first substrate 100 in section IIID-IIID of FIG. 2, FIGS. 4A and 4B show cross-sectional views of the respective manufacturing processes of the second substrate 200 in section IIID-IIID when the second substrate 200 is glued to the first substrate 100 of FIG. 2, and FIG. 4C shows a cross-sectional view of the respective manufacturing processes of the first substrate 100 and the second substrate 200 in section IIID-IIID when the second substrate 200 is glued to the first substrate 100 of FIG. 2.

2-2. First Substrate Groove Forming Process

Firstly, with respect to the first substrate 100 (a surface roughness Ra=1 nm or less, a thickness 500 μm) formed of quartz glass which is a manufacturing material of the base substrate 11, a desired electrode pattern is formed by using a resist layer as a mask. Herein, the desired electrode pattern is one in which the above-mentioned various grooves are formed for each of nine chip regions 101, as shown in FIG. 2. Moreover, a portion, where the resist is not formed, is anisotropically etched, and as shown in FIG. 3A, the electrostatic gap forming groove 111 having the depth of 1 μm, the first wiring forming groove 113, the first air communication groove 120, and the second air communication groove 130 are formed. Simultaneously, the second wiring forming groove 114, which is not shown in FIG. 3A, is also formed.

Figure 3B:
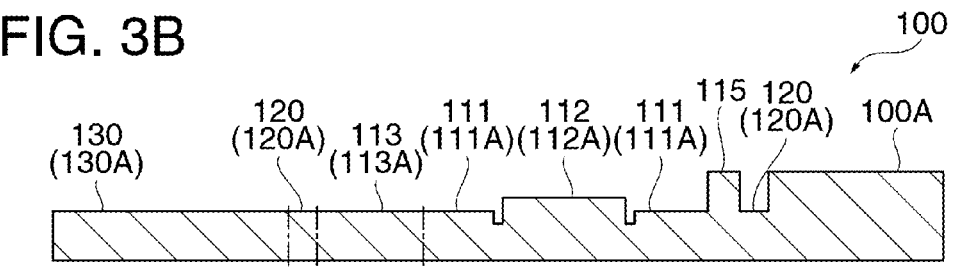
Figure 3C:
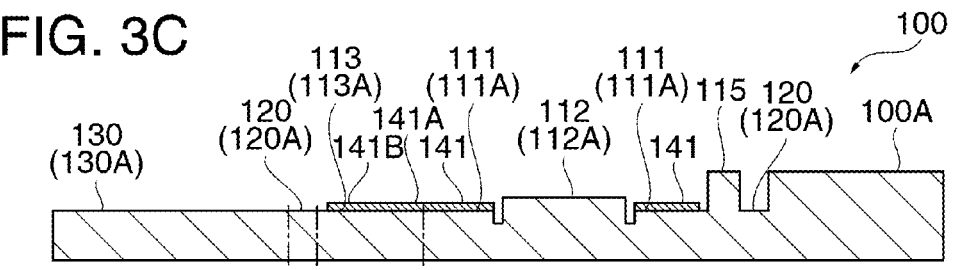
Figure 4A:
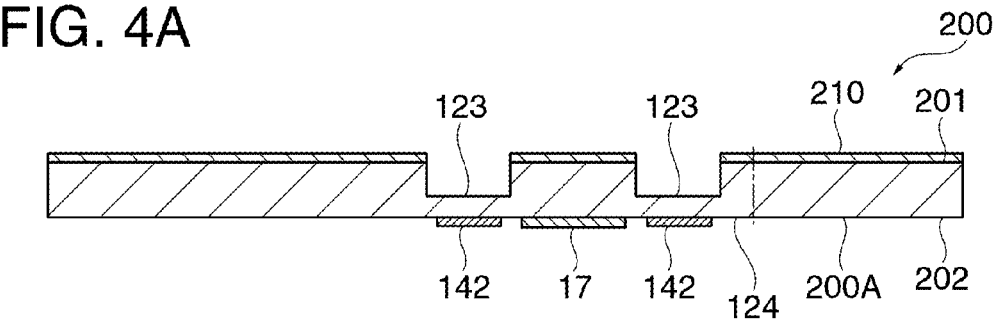
FIGS. 4A to 4C are cross-sectional views that show a manufacturing process of a second substrate and an etalon of the embodiment.
Figure 4B:
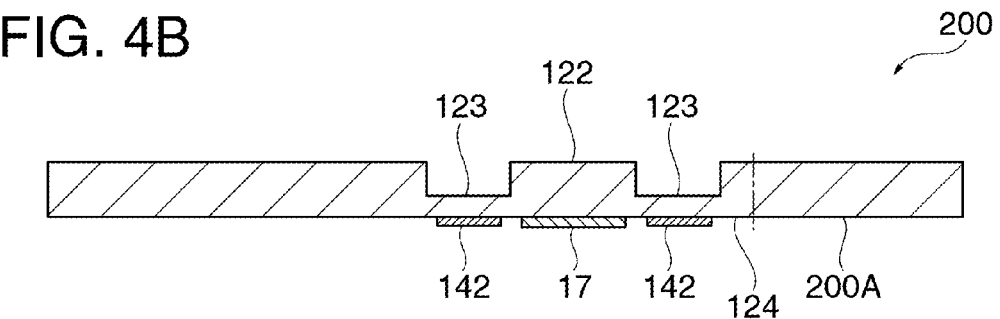
Figure 4C:
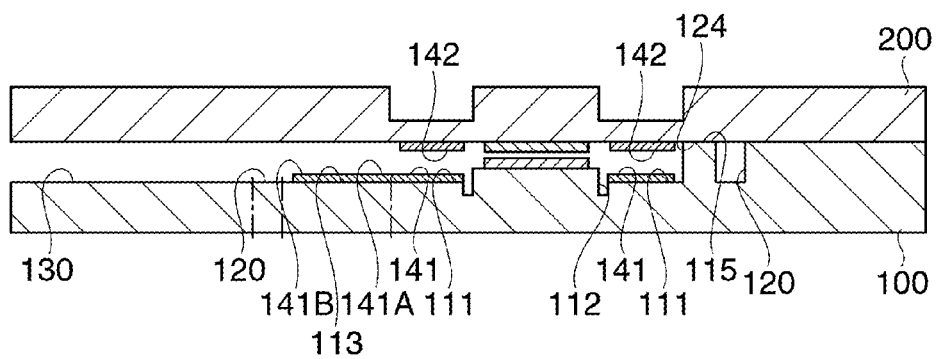

Next, as shown in FIG. 3B, the anisotropic etching is performed so that the pattern of the mirror fixing portion 112 has a depth of 200 nm using the resist layer as the mask. As a result, the mirror fixing portion 112 is formed.

2-3. First Substrate Wiring Forming Process

Thereafter, on the entire surface of the first substrate 100, the Cr/Au film for forming the electrode is formed by the sputtering (not shown). As the thicknesses of the respective films at this time, the Cr film is 10 nm, and the Au film is 200 nm. Moreover, the electrode pattern, which is matched to the electrostatic gap forming groove 111 and the first wiring forming groove 113 formed in the above-mentioned process, is etched using the resist layer as the mask, thereby forming the first electrode 141, the first wiring portion 114A and the first electrode pad 141B shown in FIG. 3C.

Figure 3D:
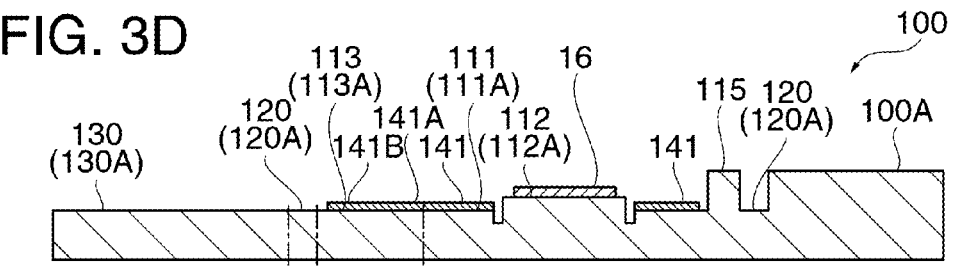

On the entire surface of the first substrate 100, the reflection film (Ag-based alloy or the like) is formed by sputtering (not shown). The thickness of the film may be suitably adjusted depending on a desired optical property. Moreover, the resists are formed on the forming portions of the fixed mirror 16 (about φ3 mm) on the formed reflection film, respectively. Additionally, by removing the reflection film of the portion where the resist is not provided, as shown in FIG. 3D, the fixed mirror 16 is formed.

As a result, the base substrate 11 is formed.

2-4. Second Substrate Forming Process

On both surfaces of the second substrate 200 (surface roughness Ra=1 nm or less, thickness 200 μm) formed of quartz glass which is a manufacturing material of the diaphragm substrate 12, the Cr/Au film 210 (Cr film 10 nm/Au film 200 nm) is formed by sputtering. Moreover, on the surface 201 of the side forming the diaphragm, the Cr/Au film 210 is used as the etching mask, the Cr/Au film of the portion corresponding to the diaphragm is removed, and the etching is performed, thereby forming the diaphragm having a depth of 150 μm. Meanwhile, on the surface 202 of the side forming the electrode, photolithography and etching are performed depending on a desired electrode pattern with respect to the Cr/Au film, thereby forming the second electrode 142, the second wiring portion 142A, and the second electrode pad 142B (see FIG. 4A, but the second wiring portion 142A and the second electrode pad 142B are not shown).

Next, after removing the Cr/Au film 210 of the surface 201 of the side forming the diaphragm, on the entire surface of the surface 202 of the side forming the electrode, the reflection film (Ag-based alloy or the like) is formed by sputtering. The thickness of the film may be suitably adjusted depending on a desired optical property. Furthermore, the resists are formed in the forming portions of the movable mirror 17 (about φ3 mm) on the formed reflection film, respectively. Additionally, by removing the reflection film of the portion where the resist is not provided, as shown in FIG. 4B, the movable mirror 17 is formed. As a result, the second substrate 200 is formed.

2-5. Gluing Process

Next, the first substrate 100 with the plurality of base substrates 11 formed thereon and the second substrate 200 with the plurality of diaphragm substrates 12 formed thereon in the above-mentioned process overlap with each other, thereby gluing the joining surfaces 115 and 124 by a joining method using a siloxane combination. Specifically, the joining films are formed on the joining surface 115 of the base substrate 11 and the joining surface 124 of the diaphragm substrate 12 using a plasma polymerization method. At this time, it is desirable to use a mask to which only the joining surfaces 115 and 124 are exposed. Moreover, energy is given to the joining films such as irradiating ultraviolet rays to activate the joining surfaces of the joining films, the joining films are overlapped with each other, and a uniform load (for, example, 100 kgf) is applied to the thickness direction of the base substrate 11 and the diaphragm substrate 12, thereby joining the substrates. In addition, the joining method can use a known method such as a method of applying an adhesive, and a method of interposing a metallic member, without being limited thereto. Furthermore, in the case of using the method of interposing the metallic member, since the manufacturing process can be simplified by the use of the film of the same material as the respective electrodes of the base substrate 11 and the diaphragm substrate 12 as the joining film, it is desirable to use Cr/Au film or the like.

2-6. Cutting Process

Next, each chip region is cut in a state in which the first substrate 100 and the second substrate 200 are glued to each other, thereby obtaining nine etalons 1.

3. Configuration of Color Measurement Module

Figure 5:
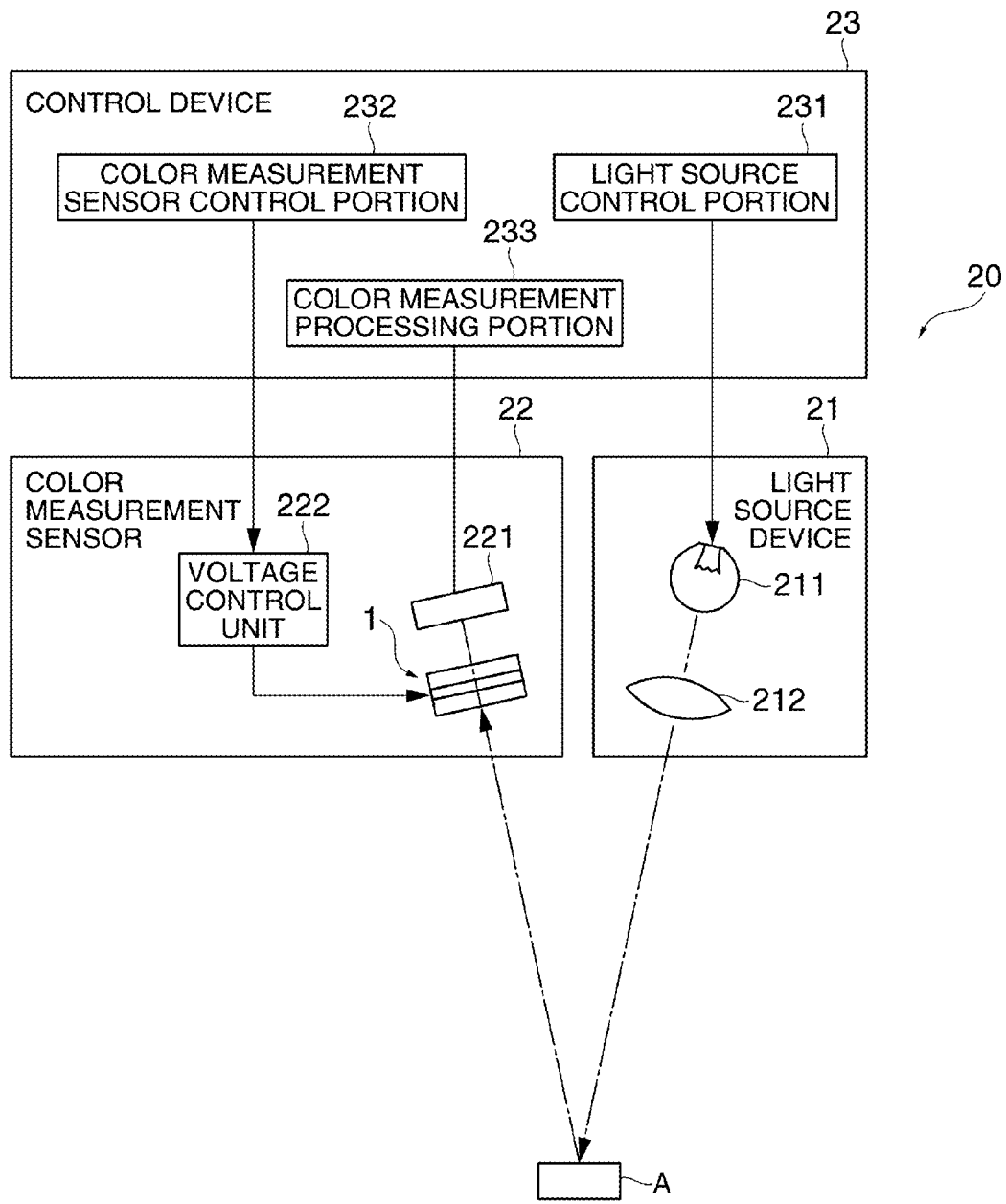
FIG. 5 is a diagram that shows a schematic configuration of a color measurement module using the etalon of the embodiment.

Next, a color measurement module including the above-mentioned etalon 1 will be described with reference to the drawings. As shown in FIG. 5, the color measurement module 20 includes a light source device 21 that emits the light to a target to be tested A, a color measurement sensor 22, and a control device 23 that controls the entire operation of the color measurement module 20. Moreover, the color measurement module 20 is a module which reflects the light emitted from the light source device 21 by the target to be tested A, senses the reflected light to be tested by the color measurement sensor, and analyzes and measures the chromaticity of the light to be tested, that is, the color of the target to be tested A, based on the detection signal output from the color measurement sensor 22.

The light source device 21 includes a light source 211, and a plurality of lenses 212 (only one of them is shown in FIG. 5), and emits white light to the target to be tested A. Furthermore, in the plurality of lenses 212, a collimator lens is included, and the light source device 21 makes the white light emitted from the light source 211 to a parallel light by the collimator lens, and emits the same from a projection lens (not shown) to the target to be tested A.

The color measurement sensor 22 includes the etalon 1, a light sensing element 21 as alight sensing unit that senses the light being transmitted by the etalon 1, and a voltage control unit 222 that changes the wavelength of the light to be transmitted by the etalon 1. Furthermore, the color measurement sensor 22 includes an incident optical lens (not shown) which guides the reflection light (the light to be tested) reflected by the target to be tested A to the inside, in a position facing the etalon 1. Moreover, the color measurement sensor 22 divides only the light of a predetermined wavelength in the light to be test, which is incident from the incident optical lens, by the etalon 1, and senses the divided light by the light sensing element 221.

The light sensing element 221 includes a plurality of photoelectric exchange elements and creates the electric signal depending on the light sensing amount. Moreover, the light sensing element 221 is connected to the control device 23 and outputs the created electric signal to the control device 23 as the light sensing signal.

The voltage control unit 222 constitutes the variable wavelength interference filter together with the etalon 1. The voltage control unit 222 controls the voltage to be applied to the first electrode 141 and the second electrode 142 of the electrostatic actuator 14 based on the control signal to be input from the control device 23.

The control device 23 controls the entire operation of the color measurement module 20. As the control device 23, for example, a universal personal computer, a portable information terminal, a color measurement dedicated computer or the like can be used.

Moreover, the control device 23 includes a light source control portion 231, a color measurement sensor control portion 232, a color measurement processing portion 233 or the like.

The light source control portion 231 is connected to the light source device 21. Moreover, the light source control portion 231 outputs a predetermined control signal to the light source device 21, for example, based on the setting input of a user, and emits the white light of a predetermined brightness from the light source device 21.

The color measurement sensor control portion 232 is connected to the color measurement sensor 22. Moreover, the color measurement sensor control portion 232 sets the wavelength of the light sensed by the color measurement sensor 22, for example, based on the setting input of a user, and outputs a control signal with the object of detecting the light sensing amount of the light of the wavelength to the color measurement sensor 22. As a result, the voltage control unit 222 of the color measurement sensor 22 sets the application voltage to the electrostatic actuator 14 so that a user can transmit only the wavelength of a desired light, based on the control signal.

4. Working Effect of Present Embodiment

According to the present embodiments, the following working effect can be exhibited.

In the first substrate 100 on which the base substrate 11 of the etalon 1 is formed, the electrostatic gap forming groove 111, the first wiring forming groove 113, the second wiring forming groove 114, the first air communication groove 120, and the second air communication groove 130 are formed. The electrostatic gap forming grooves 111 situated in the center of the respective base substrates 11 communicate with the first wiring forming groove 113 and the second wiring forming groove 114 extending to the outer periphery of the respective base substrates 11, and the first wiring forming groove 113 and the second wiring forming groove 114 of the base substrates 11, which are adjacent to each other, communicate with each other. Furthermore, the first wiring forming groove 113 and the second wiring forming groove 114 communicate with the first air communication groove 120 formed along the outer periphery of the chip array 110 formed of the plurality of base substrates 11, and the first air communication groove 120 communicates with the second air communication groove 130 extending to the outer periphery of the first substrate 100. That is, the electrostatic gap forming groove 111, the first wiring forming groove 113, the second wiring forming groove 114, the first air communication groove 120, and the second air communication groove 130 communicate with each other.

For this reason, when the first substrate 100 with the plurality of base substrates 11 formed thereon is glued to the second substrate 200 with the plurality of diaphragm substrates 12 thereon, it is possible to discharge the air of the gap forming space to the outside of the first substrate 100 by the electrostatic gap forming groove 111, the first wiring forming groove 113, the second wiring forming groove 114, the first air communication groove 120, and the second air communication groove 130. Thus, since it is possible to prevent the air form being accumulated in the gap forming space, the gap between the mirrors 16 and 17 can be accurately controlled.

Furthermore, since the first wiring forming grooves 113 of the respective base substrates 11 are connected to the second wiring forming grooves 114 of the adjoining base substrate 11, the electrostatic gap forming grooves 111, the first wiring forming grooves 113, and the second wiring forming grooves 114 of all the base substrates 11 communicate with each other. For this reason, it is possible to effectively and uniformly discharge the air in the gap forming space of the respective base substrates 11 to the outside of the first substrate 100. Thus, it is possible to manufacture a plurality of etalons 1 without irregularity in quality.

In addition, since the electrostatic gap forming groove 111, the first wiring forming groove 113, the second wiring forming groove 114, the first air communication groove 120, and the second air communication groove 130 can be concurrently formed by merely forming a predetermined electrode pattern and performing etching, the manufacturing efficiency is excellent.

Furthermore, in the etalon 1 thus manufactured, since the electrostatic gap forming groove 111, the first wiring forming groove 113, and the second wiring forming groove 114 communicate with each other, even if the internal pressure of the gap forming space increases due to a change in atmospheric pressure, the air of the gap forming space can be discharged to the outside by the first wiring forming groove 113 and the second wiring forming groove 114. Thus, the gap between the mirrors can be accurately controlled, and a satisfactory optical property can be obtained.

5. Modified Example

The invention is not limited to the above-mentioned embodiment, but the modification, the improvement or the like in the scope capable of achieving the object of the invention are included in the invention.

For example, in the above-mentioned embodiment, the first air communication groove 120 along the outer periphery of the chip array 110 formed of the plurality of base substrates 11 was formed, but the first air communication groove 120 may not be provided. In this case, the second air communication groove 130 is directly connected to the first wiring forming groove 113 and the second wiring forming groove 114 extending to the outer periphery of the respective base substrates 11.

According to this, since the electrostatic gap forming groove 111, the first wiring forming groove 113, the second wiring forming groove 114 and the second air communication groove 130 communicate with each other, the air in the gap forming space can be discharged to the outside of the first substrate 100. Particularly, by directly discharging the air from the first wiring forming groove 113 and the second wiring forming groove 114 to the outside by the second air communication groove 130, the internal pressure increase or the like in the air communication groove does not occur, and peeling between the first substrate 100 and the second substrate 200 can be prevented.

The entire disclosure of Japanese Patent Application No. 2010-094765, filed Apr. 16, 2010 is expressly incorporated by reference herein.

What is claimed is:

1. A method of manufacturing a variable wavelength interference filter comprising:
    forming, in a chip region of a first substrate having a translucency, an electrostatic gap forming groove for forming an electrostatic gap and a wiring forming groove extending from the electrostatic gap forming groove to an outer peripheral edge of the chip region, and forming, in a region other than the chip region of the first substrate, an air communication groove, through which the wiring groove forming groove communicates with the outer peripheral edge of the first substrate;
    forming a first reflection film and a first electrode in the electrostatic gap forming groove, and forming a first wiring to be connected to the first electrode along the wiring forming groove;
    forming a second substrate having translucency which includes a second reflection film facing the first reflection film, a second electrode facing the first electrode, and a second wiring that faces the wiring forming groove and is connected to the second electrode; and
    gluing the first substrate and the second substrate.

2. The method according to claim 1,
    wherein the plurality of chip regions are disposed adjacently to each other in the first substrate, and
    in the forming of the electrostatic gap forming groove, the wiring forming grooves, are connected to each other in the outer peripheral edges of the chip regions adjacent to each other, are formed.

3. The method according to claim 1,
    wherein a chip array with the plurality of chip regions disposed therein is formed on the first substrate, and
    a part of the air communication groove is provided along the outer peripheral edge of the chip array.

4. A method of manufacturing a variable wavelength interference filter,
    wherein, after, in a first substrate having translucency, a groove for forming an electrostatic gap and a groove communicating from the groove to the outside of the first substrate are formed, a reflection film and an electrode are formed in the groove for forming the electrostatic gap, and then, the first substrate is glued to the second substrate, thereby preventing air stagnation from occurring in the electrostatic gap.

5. A variable wavelength interference filter that is formed by gluing a first substrate having translucency and a second substrate having translucency,
    wherein the first substrate includes
        a chip region that includes an electrostatic gap forming groove for forming an electrostatic gap, a first reflection film, and a first electrode;
        a wiring forming groove that extends from the electrostatic gap forming groove to an outer peripheral edge of the chip region; and
        an air communication groove through which the wiring forming groove communicates with the outer peripheral edge of the first substrate,
    the second substrate includes
        a second reflection film that faces the first reflection film;
        a second electrode that faces the first electrode; and
        a second wiring that faces the wiring forming groove and is connected to the second electrode, and
    in the first substrate, wiring forming grooves are included in which chip regions of the plurality of chip regions are disposed adjacently to each other and are connected to each other in the outer peripheral edges of the chip regions adjacent to each other.

* * * * *